United States Patent
Cisar

(12) 
(10) Patent No.: US 6,492,431 B1
(45) Date of Patent: Dec. 10, 2002

(54) PROCESS OF MAKING A COMPOSITE MEMBRANE

(75) Inventor: Alan J. Cisar, Cypress, TX (US)

(73) Assignee: Lynntech, Inc., College Station, TX (US)

(*) Notice: Subject to any disclaimer, the term of this patent is extended or adjusted under 35 U.S.C. 154(b) by 55 days.

(21) Appl. No.: 09/679,709

(22) Filed: Oct. 5, 2000

Related U.S. Application Data

(62) Division of application No. 09/026,928, filed on Feb. 20, 1998.

(51) Int. Cl.$^7$ .............................. C08J 5/20; C08J 9/22; C08J 9/36
(52) U.S. Cl. ............................ 521/28; 521/31; 521/37; 521/38; 521/53; 521/134; 521/139
(58) Field of Search ............................. 521/53, 28, 31, 521/37, 38, 134, 139

(56) References Cited

U.S. PATENT DOCUMENTS

| | | | |
|---|---|---|---|
| 4,024,036 A | 5/1977 | Nakamura et al. | |
| 4,720,334 A | 1/1988 | Dubois | |
| 4,804,592 A | 2/1989 | Vanderborgh et al. | |
| 4,849,311 A | 7/1989 | Itoh et al. | |
| 4,902,308 A | 2/1990 | Mallouk et al. | |
| 5,082,472 A | 1/1992 | Mallouk et al. | |
| 5,094,895 A | 3/1992 | Branca et al. | |
| 5,334,292 A | 8/1994 | Rajeshware et al. | |
| 5,447,636 A | 9/1995 | Banerjee | |
| 5,463,005 A | 10/1995 | Desmarteau | |
| 5,512,263 A | 4/1996 | McIntyre | |
| 5,523,181 A | 6/1996 | Stonehart et al. | |
| 5,547,551 A | 8/1996 | Bahar et al. | |
| 5,599,614 A | 2/1997 | Bahar et al. | |
| 5,602,185 A | 2/1997 | Stone et al. | |
| 5,635,041 A | 6/1997 | Bahar et al. | |
| 5,643,968 A | 7/1997 | Andreola et al. | |
| 5,654,109 A | 8/1997 | Plowman et al. | |
| 5,682,261 A | 10/1997 | Takada et al. | |
| 5,746,954 A | 5/1998 | Aikman, Jr. | |
| 5,783,054 A | 7/1998 | Raguse et al. | |
| 6,042,958 A | 3/2000 | Denton et al. | |
| 6,252,000 B1 | 6/2001 | O'Brien et al. | |

FOREIGN PATENT DOCUMENTS

| WO | WO 97/25369 | 7/1997 |
|---|---|---|
| WO | WO 97/41168 | 11/1997 |

*Primary Examiner*—Morton Foelak
(74) *Attorney, Agent, or Firm*—Streets & Steele; Jeffrey L. Streets

(57) ABSTRACT

The present invention relates to methods of fabricating composite membranes wherein at least one of the components is initially provided in the form of a precursor. The composite material comprising the precursor is processed to transform the precursor and obtain a membrane having a desired property. Including a thermoplastic precursor to a desired component, which itself is less thermoplastic, permits separate pieces of the membrane to be joined by welding or other thermal processes relying on the meltability of the components to achieve a bond. The invention also encompasses fabricating a reinforced ion conducting membrane by melting and mixing a non ion-conducting precursor to an ion-conducting polymer with an essentially inert polymer. The composite material is then processed to transform the non ion-conducting polymer into the ion-conducting form. The mixing of the precursor and the inert polymer may also be achieved by co-precipitating a solution of the precursor and a suspension of the inert polymer; impregnating the precursor onto the walls of the pores of a porous, essentially inert polymer; filling the pores of a porous, essentially inert polymer with a solution comprising a non ion-conducting precursor to an ion conducting polymer and evacuating the solvent to substantially fill the pores of a the porous, essentially inert polymer with the precursor; or melting the precursor, filling the pores of porous essentially inert polymer with the melted precursor and cooling the precursor to form an essentially pore free composite membrane.

85 Claims, 2 Drawing Sheets

PROCESS OF MAKING A COMPOSITE MEMBRANE

This application is a divisional application of U.S. patent application Ser. No. 09/026,928 filed on Feb. 20, 1998.

FIELD OF THE INVENTION

The present invention relates generally to the field of ionically conducting separators. The invention particularly relates to methods and processes of fabricating composite membranes especially useful in electrochemical devices requiring a proton conductor such as fuel cells.

BACKGROUND OF THE INVENTION

The operation of an electrochemical cell requires the occurrence of oxidation and reduction reactions which produce or consume electrons. In operation, an electrochemical cell is connected to an external load or to an external voltage source, and electric charge is transferred by electrons between the anode and the cathode through the external circuit. To complete the electric circuit through the cell, an additional mechanism must exist for internal charge transfer. This mechanism includes one or more electrolytes, which support charge transfer by ionic conduction. Electrolytes must be poor electronic conductors to prevent internal short circuiting of the cell.

One category of electrolytes particularly suitable for use in conjunction with electrochemical cells are proton exchange membranes (PEM). PEMs usually consist of a polymer matrix to which are attached functional groups capable of exchanging cations or anions. The polymer matrix generally consists of an organic polymer such as polystyrene, or other polytetrafluoroethylene (PTFE) analog. In general the material is acid with a sulfonic acid group incorporated into the matrix.

The apparent advantages of using PEMs in fuel cells are numerous. The solid electrolyte membrane is simpler and more compact than other types of electrolytes. Also, the use of a PEM instead of a liquid electrolyte offers several advantages, such as simplified fluid management and elimination of the potential of corrosive liquids. In systems using a PEM, the membrane also serves as an electronically insulating separator between the anode and cathode. However, a number of properties are desirable when using an acid ion exchange membrane as an electrolyte. These include: high ionic conductivity with zero electronic conductivity; low gas permeability; resistance to swelling; minimal water transport; high resistance to dehydration, oxidation, reduction and hydrolysis; a high cation transport number; surface properties allowing easy catalyst bonding, and mechanical strength.

Conventional proton conducting membranes for use in polymer electrolyte membrane (PEM) fuel cells consist of homogeneous polymer films. FIGS. 1 and 2 are schematic diagrams depicting three examples of homogeneous polymer films used in polymer electrolyte membranes. The polymers depicted in FIG. 1 were developed at DuPont and Dow Chemical Company. These polymers represent a class of compounds known as perfluorosulfonic acids (PFSA). These polymers are fully fluorinated, i.e., all of the sites occupied by hydrogen atoms in a conventional hydrocarbon polymer have been replaced by fluorine atoms. This makes the polymers extremely resistant to chemical attack.

PFSA polymers are generally synthesized by the copolymerization of a derivatized, or active, comonomer with tetrafluoroethylene, (TFE), as illustrated in FIG. 3. After synthesis, the thermoplastic polymer, which is both hydrophobic and electrochemically inert, is converted into the active ionomer by a base hydrolysis process, as illustrated. The result of this step is an ionomer in its salt form. This can be converted to the proton form by ion-exchange with a strong acid. The sulfonate functionalities ($R-SO_3^-$) act as the stationary counter charge for the mobile cations ($H^+$, $Li^+$, $Na^+$, etc.) which are generally monovalent.

Another type of polymer, illustrated in FIG. 2, is a derivatized trifluorostyrene (TFS), of the type developed by Ballard. This polymer has a fully fluorinated backbone, but some of the side chains have hydrogen atoms.

The polymer is synthesized by copolymerizing derivatized and non-derivitized trifluorostyrene monomers, as illustrated in FIG. 4. This process also produces an electrochemically inactive thermoplastic. In this system the derivatized monomers create the inert sites while the non-derivatized monomers can be sulfonated, as illustrated in FIG. 4. The result of this process is a proton conducting polymer.

Other homogeneous proton conducting polymers are tabulated in Table I. All of these polymers tend to have poor physical properties making them difficult to handle. For example, sheets of the polymers are easily torn or punctured, thereby requiring a minimum usable thickness of about 2 mils (0.002", 0.05 mm).

TABLE I

| Other Homogeneous Polymer Electrolytes | |
| --- | --- |
| Manufacturer | Polymer |
| DAIS Corp. | Sufonated styrene-butadiene block copolymer |
| Maxdem, Inc. | Sufonated polyparaphenylene |
| (Not yet commercial) | Sulfonated side chains radiation grafted to PTFE |

In U.S. Pat. No. 5,547,551 Bahar et. al disclose a composite membrane fabricated by filling the void portion of a porous substantially inert polymer membrane with an ionically conducting polymer. This approach starts with a porous membrane fabricated from an inert polymer, such as polytetrafluoroethylene (PTFE) and converts it to an ion conducting membrane by filling the pores with ionomer deposited from solution. This approach leads to thinner membranes, with membranes less than 1 mil (0.001", 0.025 mm) produced. These membranes are more conductive than pure PFSA membranes on a conductivity per unit area basis, but have lower specific conductivities. The advantage of these membranes is their strength. A 1 mil membrane produced using this technology is tougher than a conventional 5 mil homogeneous membrane.

In U.S. Pat. No. 5,654,109, Plowman et al. disclose an alternate approach to the fabrication of reinforced membranes. In this approach, a core layer of a tough membrane material is clad with surface layers of highly ionically conductive polymer. Typically all of the layers are PFSA type materials, with the core layer having a significantly higher equivalent weight than the surface layers. Although it would seem that the use of a high equivalent weight polymer would significantly impede the proton flux, it has been experimentally determined that a membrane with a core having an equivalent weight as much as 20% greater than the surface layers exhibits a conductivity equivalent to a solid membrane with the composition of the surface polymer.

While the above methods and processes may allow the fabrication of composite membranes that may present enhanced structural stability and ionic conductivity, the methods used do not allow the flexibility needed in fabricating composite membranes suitable for use in a wide range of applications. Thus there is a great need for membranes and membrane fabricating processes that allow greater flexibility in controlling the physical properties of the composite membranes.

SUMMARY OF THE INVENTION

The present invention provides a method of making a composite membrane, comprising: (a) combining a first polymer component with a second polymer component; wherein the first polymer component is a non ion-conducting precursor to an ion-conducting polymer; and (b) converting the first polymer component from the non ion-conducting precursor to the ion-conducting polymer.

The combining of the polymeric components may comprise melting and mixing the polymers, co-polymerizing two or more monomers, co-precipitating a solution of a first polymer and a suspension of a second polymer, filling the pores of a porous polymeric matrix with a solution of a second polymer, or filling the pores of a porous polymeric matrix with a melted polymer.

The invention encompasses a process wherein the step of combining the first and second polymer components comprises mixing a solution of the first component and a suspension of the second component, co-precipitating the first and second polymer components to form a gelatinous mass, and drying the gelatinous mass. The dried gelatinous mass may further be sintered and/or pressed into a sheet, optionally at temperatures of about 150° C. or about 300° C. Pressing the gelatinous mass into a sheet may be achieved by rolling the mass.

The processes of the invention may also combine the first and second polymer components by forming a solution of the first polymer component, filling the pores of the porous matrix with the solution; removing the solvent from the pores of the matrix to form an essentially pore-free composite material. Alternatively, the first and second polymer components may be combined by melting the first polymer component, filling the pores of the porous matrix with the first polymer component, and cooling the polymer to form an essentially pore-free composite material.

The composite membranes formed by the processes of the invention may comprise regions essentially made of the first polymer component and regions essentially made of the second polymer component. Further, the first polymer component may form an ion-conducting path, generally a hydrophilic path capable of transporting ions through the membrane.

The invention also encompasses a method of making a composite membrane, comprising: (a) initiating a living chain co-polymerization of a first monomer and a second monomer, wherein the first monomer is a non-derivatizable monomer and the second monomer is a non ion-conducting precursor to an ion-conducting monomer; (b) propagating the polymerization to form a co-polymer chain comprising a given number of non-derivatizable monomers and a given number of precursor monomers; (c) fabricating a membrane from the co-polymer chain; and (d) transforming at least a portion of the non ion-conducting precursor monomers into ion-conducting monomers. The non-derivatizable monomers and precursor monomers may be randomly distributed along the co-polymer chain. Depending on the application of the composite membrane, the number of non-derivatizable monomers in the co-polymer chain may be greater or lower than the number of precursor monomers in the co-polymer chain. The process of the invention allows the fabrication of composite membranes wherein the co-polymer chain comprises regions wherein most or all of the monomers are non-derivatizable monomers and regions wherein most or all of the monomers are precursor monomers or ion-conducting monomers obtained by transforming precursor monomers. The regions comprising precursor monomers or ion-conducting monomers obtained by transforming precursor monomers may form an ion-conducting path, generally a hydrophilic path capable of transporting ions through the composite membrane.

Finally, the processes of the invention are applicable to any combination of polymeric components as well as combination of a polymeric component and a non polymeric component. For example, the first component may be a precursor to an ion conducting polymer component selected from long side chain perfluorosulfonic acid, short side chain perfluorosulfonic acid, trifluorostyrene, partially derivatized trifluorostyrene, polystyrene, and mixtures thereof. The second polymer component may be a substantially inert polymer selected from polytetrafluoroethylene (PTFE), perfluoroalkoxy derivative of PTFE (PFA), fluorinated ethylene-propylene copolymer (FEP), polyvinyl chloride, polyvinyl dichloride, polyvinyl fluoride (PVF), polystyrene, polytrifluorostyrene (TFS), polyetherketone, polyethersulfone, polyparaphenylene, and mixtures thereof. When the second component is a porous matrix, the second component may be an inorganic material selected from fiber glass, fibrous quartz, rock wool, fibrous alumina, fibrous silica, or other fibrous silicates or alumino-silicates, and mixtures thereof.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
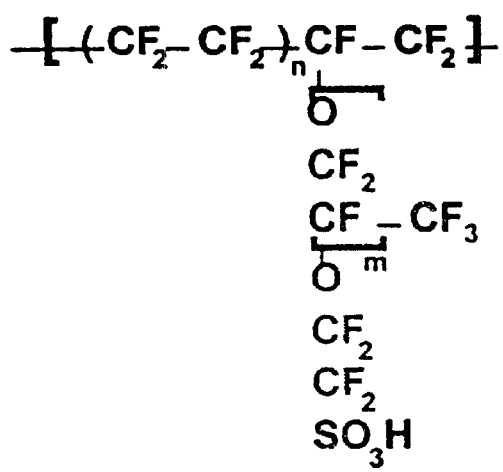
FIG. 1 is the generic chemical structure for perfluorinated sulfonic acid (PFSA) polymers used as PEM membranes.
Figure 2:
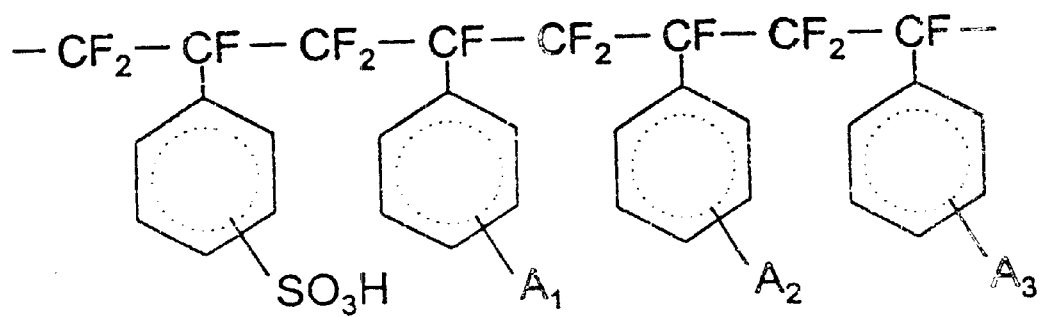
FIG. 2 represents the chemical structure of derivatized trifluorostyrene (TFS) having a fully fluorinated backbone, but some of the side chains have hydrogen atoms.
Figure 3:
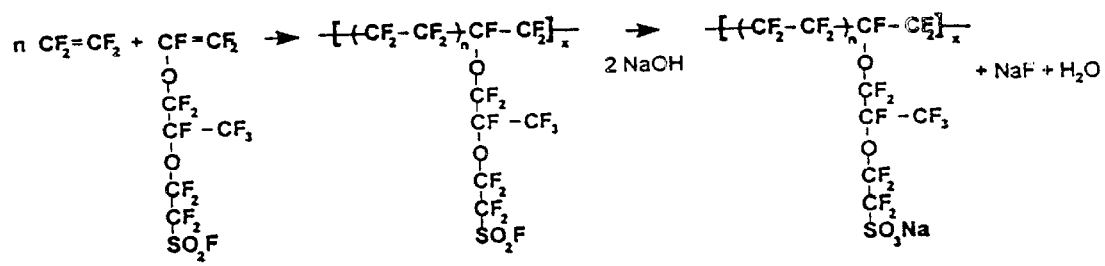
FIG. 3 is a chemical equation for synthesizing PFSA polymers by the copolymerization of a derivatized, or active, comonomer with tetrafluoroethylene.
Figure 4:
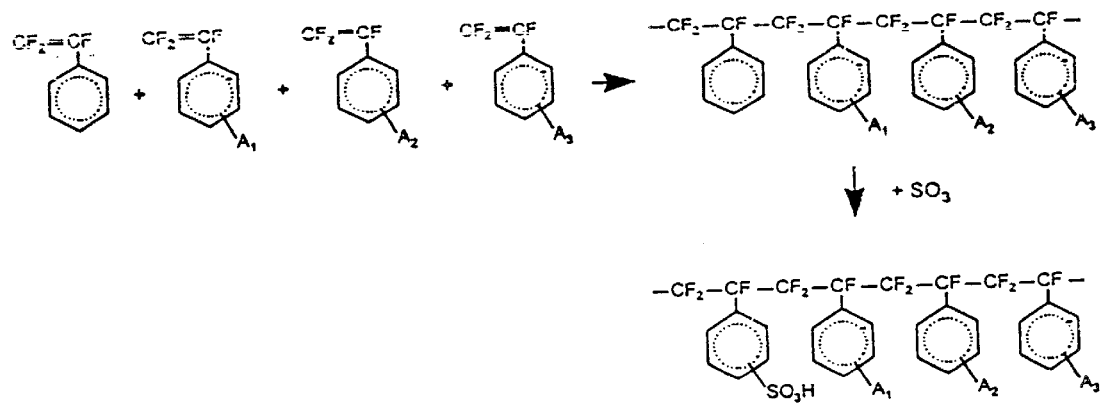
FIG. 4 is a chemical equation for synthesizing the TFS of FIG. 2 by copolymerizing derivatized and non-derivatized trifluorostyrene monomers.

The present invention provides a process of fabricating composite membranes. The process of the invention allows greater flexibility in adjusting physical properties of the membrane, such as the mechanical strength and ionic conductivity. The membranes fabricated by the methods of the invention are composite membranes comprising at least two components. Controlling the proportion of each component in the composite membrane allows for adjusting the physical properties conferred to the composite membrane by the particular component. For example, one component in the composite membrane may be essentially associated with the mechanical strength of the membrane, while another component may be essentially associated with the ionic conductivity properties of the membrane. Yet other components may provide control or influence of other qualities of the membrane. While the present specification focuses on components associated with the physical strength and ionic conductivity of the composite membrane, the methods of the invention may be readily used in fabricating composite membranes having components associated with other physical or chemical qualities of the membrane. Such methods of fabricating composite membranes are within the scope of the present invention.

One aspect of the invention provides processes of fabricating composite membranes wherein at least one of the components is initially added to the composition in the form of a precursor. The composition comprising the precursor may then be processed to transform the precursor and obtain a membrane having a desired property. Obtaining an intermediate composition, comprising precursors to one or more components, may provide more flexibility in fabricating composite membranes with properties tailored for use in a particular application.

The properties of the precursor may allow the use of certain processing methods that may be otherwise impractical or difficult to implement. For example, fabricating a composite membrane by including a thermoplastic precursor to a desired component, which itself may be less thermoplastic, may permit separate pieces of the membrane to be joined by welding or other thermal processes relying on the meltability of the components to achieve a bond.

Properties that may be better controlled by fabricating membranes through the processes of the invention include, but are not limited to, physical strength, ionic conductivity, shape stability, resistance to oxidation, durability, etc. The components in the composite membranes that may be fabricated by the methods of the invention may be organic polymers or non-polymeric substrates, such as quartz wool and woven alumina fibers.

The methods of the invention allow for combining the components in the composite membrane over a wide range of ratios between the components. Depending on the use of the membrane, a certain physical property may be more desirable than the other and the proportions of the components in the membrane may be adjusted to obtain the desired balance between the physical properties provided by each component.

For example, in a composite polymer membrane having an inert component and an ion conducting component, when high ion conductivity is the more desirable quality, the proportion of the ion conducting polymer may be maximized and the portion of the inert polymer minimized. Conversely, in applications where the structural properties may be more important, the proportion of the inert component may be maximized and the proportion of the conducting component minimized.

Since the methods of the invention allow intimate mixing of the components in the composite membrane, a component may be able to confer to the composite membrane its qualities even when the component is provided in minimal proportions. The methods of the invention may allow the fabrication of polymer compositions where the proportion of an individual component may vary between about 1 wt. % and about 99 wt. %.

For example, in applications, such as fabricating sensing devices, where ruggedness may be a more useful property than high conductivity, the amount of active polymer, used in the composite membrane, may be decreased to the minimal proportion capable of producing a continuous network. Conversely, in applications, such as the fabrication of power generation devices, where conductivity may be the more desirable property, the amount of inert polymer may be decreased to the smallest proportion capable of conferring to the composite membrane the desired structural integrity.

In PEM fuel cells the membrane electrolyte may be exposed to extremely oxidizing conditions. Not only may one side of the membrane be exposed to air at elevated temperatures, but the fuel cell reactions themselves may produce trace levels of hydrogen peroxide and peroxyl radicals. These compounds are extremely powerful oxidizers that may readily attack hydrocarbons and partially halogenated polymers. Thus it may be highly advantageous to use composite membranes with controlled resistance to oxidation.

Controlling the membrane's resistance to oxidation may be achieved by including in the composite membrane a polymer having high resistance to oxidation and adjusting the proportion of such a polymer to achieve the desired qualities while conserving other qualities such as ionic conductivity, thickness and structural integrity. Perfluorinated materials, such as PTFE and PFSA, are highly resistant to oxidation. Adjusting the proportion of these polymers in a composite membrane may allow better control of the chemical and structural properties of the membrane.

While some polymers, such as PFSA polymers, may have high ionic conductivity, they also have a strong affinity for water and consequently undergo a significant change in size when the amount or activity of the water in the environment changes. Controlling the shape of composite membranes comprising a polymer, such as a PFSA polymer, may be achieved by including in the membrane a component whose shape does not change with the activity of the water contacting the membrane. Further, the processes of the invention may allow the fabrication of composite membranes where the change in the size of one component may be limited by the presence of another component in the membrane.

The processes of the invention allow better use of lower equivalent weight ionomers. Lowering the equivalent weight of an ionomer generally leads to an improvement in conductivity. But the gain in ionic conductivity provided by low weight ionomers is often offset by the loss of certain physical qualities, such as tear strength and puncture resistance. Composite membranes fabricated by the processes of the invention may comprise a reinforcing component that supplies structural integrity to the membrane while the low molecular weight ionomer may confer to the membrane the desired ionic conductivity.

Another aspect of the invention provides a process of fabricating a reinforced ionically conducting membrane by blending at least two thermoplastic polymers, forming a membrane, and derivatizing one of the components of the blend. For example, a composite membrane having controlled ion conductivity and structural integrity may be fabricated by melting a precursor to an ion conducting polymer, such as the sulfonyl fluoride intermediate form of a PFSA polymer or the unsulfonated form of a trifluorostyrene (TFS) polymer, with an inert polymer providing structural strength, such as PTFE. The two polymers may be thoroughly blended, and fabricated into a membrane by fabrication methods such as extrusion or casting. The ionically conducting membrane may then be obtained by hydrolyzing the precursor with a strong base in the case of sulfonyl fluoride precursors to PFSA membranes, or by sulfonating the precursor to TFS in TFS containing membranes.

While it may be advantageous to blend polymers that are fully miscible, The processes of the invention may also be applied to the blending of polymers that are partially miscible or non miscible. Fully miscible polymers may be more easily combined in any proportions, while partially miscible polymers may be easily combined over only the range of their full miscibility. Outside the fully miscible range, or if the polymers are immiscible, the polymers may still be combined by mixing at high shear. In the case of viscous materials like high molecular weight polymers, high shear is defined as the shear at which the immiscible polymers may be spread as a finely dispersed mixture.

The composite membranes fabricated by the methods of the invention may comprise randomly blended polymers as well as alternating blocks, each block comprising essentially one particular polymer. For example, a composite membrane may be fabricated by forming, within each molecule, regions of pure PTFE and regions of low equivalent weight copolymer. The pure PTFE regions may crystallize to form a reinforcing matrix, while the low equivalent weight regions may furnish high proton conductivity paths. The methods of the invention comprise extruding and processing a polymer-block type composite membrane using the same techniques that may be used in fabricating a conventional random polymer membrane.

A further aspect of the invention provides a process of co-polymerizing two or more monomers to form a co-polymer chain molecule which may be fabricated into a composite membrane. Each monomer may provide the composite membrane with a particular set of qualities. Co-polymerizing two or more monomers may allow the fabrication of a membrane having the combined qualities of the monomers. One or more of the monomers may first be present in the form of a precursor having thermoplastic properties that would allow easier fabrication of the composite membrane. After the membrane is formed, the precursor monomers may be transformed into a form allowing the composite membrane to have one or more desired qualities associated with the transformed precursor.

The processes of the invention may use any copolymerization technique to form co-polymer chain molecule that may be used in fabricating a composite membrane. One method of copolymerization that may be used in the processes of the invention comprises: (a) initiating a radical polymerization process using a monomer not amenable to derivatization or functionalization as the only monomer; (b) allowing the polymerization to proceed to form chains or blocks of a desired length; (c) adding a substantial amount of one or more additional monomers and continuing the polymerization to produce segments or blocks on the same polymer chains which are rich in locations capable of being derivatized or functionalized to produce a polymer having a low equivalent weight when converted into an ion exchangeable form. Optionally the co-polymerization method may further comprise (d) returning the feed composition to the original monomer not amenable to derivatization or functionalization and extending the chains with additional blocks not capable of functionalization, and/or (e) adding a substantial amount of one or more additional monomers and continuing the polymerization to produce segments or blocks on the same polymer chains which are rich in locations capable of being derivatized or functionalized to produce a polymer having a low equivalent weight when converted into an ion exchangeable form. The co-polymer chains may then be used in fabricating a composite membrane that may be processed to transform the precursor monomers into a form that may confer to the composite membrane certain desirable qualities.

For example, a composite membrane may be fabricated by forming, within each molecule, regions of pure PTFE and regions of low equivalent weight copolymer. The pure PTFE regions may crystallize to form a reinforcing matrix, while the low equivalent weight regions may furnish high proton conductivity paths. The methods of the invention comprise extruding and processing a polymer-block type composite membrane using the same techniques that may be used in fabricating a conventional random polymer membrane.

Another aspect of the invention provides a process of fabricating a composite membrane comprising mixing a solution of a first polymer with a suspension of a second polymer. The mixture may then be treated to convert the first and/or second polymers into an insoluble pseudo-thermoplastic derivative that precipitates to form a gelatinous mass or a solid mass. The gelatinous mass or solid mass may be filtered from the supernatant liquid, washed and dried. The dried mass may be fabricated into a sheet and sintered. The sintered sheet may be fabricated into a composite membrane. The pseudo-thermoplastic derivatives formed in the early phases of the process may be converted back into their original form so that a composite membrane having the properties of the original components of the mixture may be formed.

For example, a composite membrane comprising an ion conducting component and an inert component may be formed by mixing a polymer, such as NAFION, which is ion conducting, with a suspension of a polymer, such as PTFE, which may provide the structural reinforcing element in the membrane. The mixture may be processed to the perfluorosulfonate ionomer from the proton from, or other form with simple ions, to the tetraalkylammonium form which is a pseudo-thermoplastic, and not ionically conductive. The mixture may then be precipitated to form a gelatinous mass or a solid mass. The gelatinous mass or solid mass may be fabricated into a sheet and sintered. The sintered sheet may be fabricated into a composite membrane and the perfluorosulfonate component converted back to an ion conducting form through the use of a strong acid.

Yet another aspect of the invention provides a process of fabricating a composite membrane comprising an ion conducting component and a structurally stable matrix. The matrix must be porous and is preferably substantially inert. The pores or voids in the matrix may be filled with a polymer, such as a non ion-conducting thermoplastic precursor to a polymer that is ion conducting. After filling the pores of the matrix with the precursor, the precursor may be processed and transformed into the ion-conducting polymer. The process allows for the fabrication of a reinforced ionically conducting membrane with controlled ion exchange properties, which may be more difficult to obtain by directly filling the pores of the matrix with the non-thermoplastic ion conducting form of the polymer.

The present invention provides impregnation steps that may be carried out in several ways. For example, when the "filling" polymer is soluble in either a pure solvent or a blend of solvents, a solution of the polymer may be produced. The pore of the substrate may be filled with the solution. The solvent may then be evaporated to leave the polymer filling the pores of the matrix.

In composite membranes having components with significantly different melting temperatures, the "filling" polymer may be melted and deposited in the pores of the matrix. The polymer may then be cooled off to form a solid filler occupying the void in the matrix. Since there is no solvent to be removed, the process may allow fabricating a pore free membrane in less steps than would be otherwise required by the solution impregnating version of the present invention.

Impregnating a porous matrix with a precursor to an ionically conducting polymer may present several advantages. Fabricating an intermediate composite membrane comprising the thermoplastic components may permit separate pieces made of the intermediate composite material to be joined by welding or other thermal processes relying on the meltability of the components to achieve a bond. The matrices may be either polymeric or inorganic in nature. It is important that any substrate used not only be substantially inert to degradation during the hydrolysis step, but if the resulting membrane is to be used in the proton form, the substrate must be inert to degradation by acids as well.

The processes of the invention may be implemented in the fabrication of composite membranes comprising a variety of polymers. Polysulfone is a thermoplastic with excellent heat resistance and a high heat deflection temperature (150° C.). Composite membranes made with a polysulfone matrix may be less subject to creep than those made with PTFE matrices. Other polymers, such as polymethylmethacrylate, silicone rubber, and polyvinyl chloride, may also be combined with other components to form composite membranes fabricated by the processes of the invention. This listing is not exhaustive. There are other polymers which could be used in the same manner as those described here. The use of other polymers as the binder phase to produce membranes like those claimed here is considered to be obvious to one skilled in the art and within the scope of the present invention.

For example, a polymer, such as the sulfonyl fluoride intermediate form of a PFSA polymer, or the unsulfonated form of a TFS polymer, may be impregnated into the void portion of a porous, but substantially inert substrate sheet or other fabricated shape. After impregnation, the added polymer may be converted into its active ion exchange form. The final product may be suitable for use in a variety of electrochemical cells and other devices where the ability to function as an ion exchanger and good physical strength may be desirable properties.

The choice of a particular polymer or matrix may be dictated by the type of application where the composite membrane is intended to be used. When the membrane is used in a fuel cell, it is important that the polymer remain flexible under fuel cell operating conditions, and that any size change that occurs with changing conditions be relatively small.

The following example shows the function of this invention and some of its preferred embodiments.

EXAMPLE 1

Hypothetical

Powdered or pelletized PTFE may be combined with a powdered or pelletized sulfonyl fluoride polymer, such as the perfluorinated short side chain polymer (PFSF) developed by the Dow Chemical Company, having an equivalent weight of about 700 Daltons per sulfonyl fluoride group. These polymers may be melted and combined in a ratio of 40 wt. % PTFE to 60 wt. % PFSF. Since these polymers may be completely miscible, they easily form a homogeneous solution on melting and blending (at about 360° C.). The composite polymer may then be extruded to form a sheet of about 75% of the thickness desired for the final ionomer containing polymer in its dry form.

The thermoplastic film may be converted to the ionomer form by hydrolyzing in a solution of 25 wt. % NaOH at 85° C. While a solid PFSF membrane may be converted to its ionomer form in less than six hours, the composite membrane may require at least 24 hours to fully hydrolyze. Carrying out the ion exchange reaction to convert the salt form of the ionomer to the acid form is slower as well. Two exchange cycles, of six hours each, using fresh acid (25 wt. % $H_2SO_4$) may be necessary to convert the sodium polymer to the proton form. After washing in deionized water (100° C. for one hour) three times, the PTFE-PFSA composite membrane is ready for use.

EXAMPLE 2

Hypothetical

A composite membrane may be fabricated by combining a quantity of T-60 PTFE suspension (typically 60% solid) with a solution of 5 wt. %. NAFION ionomer having an equivalent weight of 950 Daltons (in proton form) and adding extra water. The proportion of each component in the mixture may be adjusted to achieve the desired ratio for the final component. The acid functions in the PFSA polymer may be neutralized with a stoichiometric amount of tetrabutylammonium hydroxide. This will precipitate the Nafion as a gelatinous mass, and bring the suspended PTFE out of suspension as well. The gelatinous mass may be transferred to a filtration apparatus to remove the excess water, and wash the material.

The sequence of the mixing and precipitating steps is optional. If desired, the PFSA may be neutralized and precipitated as a gel before the PTFE is added. If this sequence is used, dry powdered PTFE may be substituted for the suspension.

The layer obtained by the above process may then be fabricated into a membrane. This may be accomplished by calendaring, or pressing. In either case, the material may be compressed either hot or cold, but it must be heated to over 320° C. to drive off any surfactant that may have been used to keep the PTFE in suspension and to sinter the PTFE. If the press or rollers are not heated, the heating may be carried out separately in a separate step in an oven. The material should be protected from oxidation at any time that it is above a temperature of about 150° C.

The membrane produced by this process is a blend of PTFE and perfluorosulfonate, the perfluorosulfonate in the tetrabutylammonium form, which is a water repellent thermoplastic, is not a hydrophilic material. It may be converted back to the active, proton conducting form by boiling the membrane in nitric acid for 24 to 48 hours. The acidified material may then be washed thoroughly and used in the fabrication of membrane and electrode assemblies.

EXAMPLE 3

Hypothetical

A perfluorosulfonic acid (PFSA) polymer in its sulfonyl fluoride form (PFSF), as illustrated herein, is a thermoplastic. This material may be dissolved in an appropriate fluorinated solvent, such as perfluorobutylmethyl ether ($C_4F_9OCH_3$) or perfluorodecalin ($C_{10}F_{18}$). The solution may be impregnated into the pore structure of a porous expanded PTFE sheet, such as GoreTex®, (W. L. Gore and Associates, Newark, Del.) and the solvent evaporated to leave the PFSF polymer filling the pores.

Since the PFSF polymer has only limited solubility, a single treatment may not be adequate to produce a pore free membrane. In this case, the treatment process can be repeated, with multiple cycles used, if necessary, to produce a pore-free sheet.

The PFSF material may then be converted into its sulfonate form by base hydrolysis. By controlling the time and temperature of the hydrolysis the degree of conversion can be controlled, furnishing a post-polymerization method of controlling the equivalent weight of the final PFSA membrane and a way to make membranes with a tailorable, equivalent weight profile. Within certain limits, it is also possible to adjust the equivalent weight later. (i.e. if the PFSF material is not fully hydrolyzed initially, it can be at a later date.) This ionomer can be converted to the acid, or proton form, by ion exchange using an excess of a strong acid as a proton source.

The composite membranes produced by this method will have the PFSA material more tightly bound into the final structure than those produced by impregnating a solution of ionomer into the pores, since the thermoplastic PFSF polymer will initially bond tightly to the PTFE matrix and because the expansion that occurs during the hydrolysis process will aid in keying the resulting PFSA material into the pores of the matrix. The resulting membranes are suitable for use in electrochemical devices such as fuel cells.

While the foregoing is directed to the preferred embodiments of the present invention, other and further embodiments of the invention may be devised without departing from the basic scope thereof, and the scope thereof is determined by the claims which follow.

What is claimed is:

1. A method of making a composite membrane, comprising:
   (a) combining a first polymer component with a second polymer component; wherein the first polymer component is a non ion-conducting precursor to an ion-conducting polymer; and
   (b) converting the first polymer component from the non ion-conducting precursor to the ion-conducting polymer.

2. The process of claim 1 wherein the combining of the components comprises melting and mixing the polymers.

3. The process of claim 2 wherein the second polymer component comprises a substantially inert polymer.

4. The process of claim 3 wherein the substantially inert polymer is selected from polytetrafluoroethylene (PTFE), perfluoroalkoxy derivative of PTFE (PFA), fluorinated ethylene-propylene co-polymer (FEP), polyvinyl chloride, polyvinyl dichloride, polyvinyl fluoride (PVF), polystyrene, polytrifluorostyrene (TFS), polyether ketone, polyether sulfone, polyparaphenylene, and mixtures thereof.

5. The process of claim 1 wherein the ion conducting polymer component is selected from long side chain perfluorosulfonic acid, short side chain perfluorosulfonic acid, trifluorostyrene, partially derivatized trifluorostyrene, polystyrene, and mixtures or copolymers thereof.

6. The process of claim 1 wherein the first component comprises a polymer capable of being dissolved in a solvent and the second component comprises a polymer capable of forming a suspension.

7. The process of claim 6 wherein the step of combining the first and second polymer components comprises mixing a solution of the first component and a suspension of the second component, co-precipitating the first and second polymer components to form a gelatinous mass, and drying the gelatinous mass.

8. The process of claim 7 wherein the first polymer component is selected from long side chain perfluorosulfonylfluoride, short side chain perfluorosulfonylfluoride, trifluorostyrene, partially derivatized trifluorostyrene, polystyrene, polybis[{perfluoroalkyl)sulfonyl]imide and its derivatives, perfluoro-ethylene- 1,2-bis-phosphonic acid derivatives, and mixtures thereof.

9. The process of claim 7 wherein the second polymer component is selected from polytetrafluoroethylene (PTFE), perfluoroalkoxy derivative of PTFE (PFA), fluorinated ethylene-propylene co-polymer (FBP), polyvinyl chloride, polyvinyl dichloride, polyvinyl fluoride (PVF), polystyrene, polytrifluorostyrene (TFS), polyether ketone, polyether sulfone, polyparaphenylene, and mixtures thereof.

10. The process of claim 7 further comprising rolling the dried gelatinous mass into a sheet.

11. The process of claim 10 wherein the rolling is carried out at a temperature of about 150° C.

12. The process of claim 11 further comprising sintering the dried gelatinous mass at a temperature higher than 150° C.

13. The process of claim 10 wherein the rolling is carried out at a temperature of about 300° C.

14. The process of claim 13 further comprising sintering the dried gelatinous mass at a temperature higher than 300° C.

15. The process of claim 7 further comprising pressing the dried gelatinous mass into a sheet.

16. The process of claim 1 wherein the first polymer component comprises a soluble polymer and the second polymer component comprises a porous matrix.

17. The process of claim 16 wherein the step of combining the first and second polymer components comprises forming a solution of the first polymer component, filling the pores of the porous matrix with the solution; removing the solvent from the pores of the matrix to form an essentially pore-free composite material.

18. The process of claim 16 wherein the porous matrix comprises an organic polymer.

19. The process of claim 16 wherein the matrix polymer is selected from polytetrafluoroethylene (PTFE), perfluoroalkoxy derivative of PTFE (PFA), fluorinated ethylene-propylene co-polymer (FEP), polyvinyl chloride, polyvinyl dichloride, polyvinyl fluoride (PVF), polystyrene, polytrifluorostyrene (TFS), polyether ketone, polyether sulfone, polyparaphenylene, and mixtures thereof.

20. The process of claim 16 wherein the porous matrix comprises an inorganic material.

21. The process of claim 20 wherein the inorganic material is selected from fiber glass, fibrous quartz, rock wool, fibrous alumina, other fibrous silicates or alumino-silicates, and mixtures thereof.

22. The process of claim 16 wherein the soluble polymer is selected from long side chain perfluorosulfonylfluoride, short side chain perfluorosulfonylfluoride, trifluorostyrene, partially derivatized trifluorostyrene, and polystyrene.

23. The process of claim 1 wherein the second polymer component comprises a porous polymer matrix, and wherein the step of combining the first and second polymer components comprises melting the first polymer component, filling the pores of the porous matrix with the first polymer component, and cooling the polymer to form an essentially pore-free composite material.

24. The process of claim 23 wherein the second polymer component comprises an inorganic material.

25. The process of claim 24 wherein the inorganic material is selected from fiber glass, fibrous quartz, rock wool, fibrous alumina, other fibrous silicates or alumino-silicates, and mixtures thereof.

26. The process of claim 1 wherein the composite membrane comprises regions essentially made of the first polymer component and regions essentially made of the second polymer component.

27. The process of claim 26 wherein the regions essentially made of the first polymer component form an ion-conducting path capable of transporting ions through the membrane.

28. The process of claim 27 wherein the ion-conducting path comprises a hydrophilic path.

29. A method of making a composite membrane, comprising:
 (a) initiating a living chain co-polymerization of a first monomer and a second monomer, wherein the first monomer is a non-derivatizable monomer and the second monomer is a non ion-conducting precursor to an ion-conducting monomer;
 (b) propagating the polymerization to form a co-polymer chain having at least one region essentially comprised of non-derivatizable monomers and at least one region essentially comprised of precursor monomers;
 (c) fabricating a membrane from the co-polymer chain; and
 (d) transforming at least a portion of the non ion-conducting precursor monomers into ion-conducting monomers.

30. The process of claim 29 wherein the number of non-derivatizable monomers in the co-polymer chain is greater than the number of precursor monomers in the co-polymer chain.

31. The process of claim 29 wherein the number of non-derivatizable monomers in the co-polymer chain is lower than the number of precursor monomers in the co-polymer chain.

32. The process of claim 29 wherein the regions comprising precursor monomers or ion-conducting monomers obtained by transforming precursor monomers form an ion-conducting path capable of transporting ions through the composite membrane.

33. The process of claim 32 wherein the ion-conducting path comprises a hydrophilic path.

34. The process of claim 8, wherein the organic solvent is selected from perfluorobutylmethylether or perfluorodecalin.

35. A method of making an ion-conducting composite film, comprising:
 (a) combining a first electronically nonconducting and ionically nonconducting polymer component with at least a second electronically nonconducting and ionically nonconducting polymer component; wherein at least the first polymer component is a non ion-conducting precursor to an ion-conducting polymer;
 (b) fabricating the combined polymer components into a film; and
 (c) chemically converting at least a portion of at least the first polymer component from the non ion-conducting precursor form to the ion-conducting and electronically non conducting polymer form.

36. The method of claim 35, wherein the film is a membrane.

37. The process of claim 35, wherein the ion-conducting composite membrane is a cation conductor, an anion conductor, or a mixture thereof.

38. The process of claim 35, wherein the ion-conducting composite membrane has ionic conductivity; gas imperme-ability; resistance to oxidation, reduction, and change in shape with the activity of the water contacting the membrane such that the membrane is suitable for use in high current drawing, or passing, electrochemical devices.

39. The process of claim 35, wherein the ion-conducting composite membrane comprises microscopic regions essentially made of the first polymer component and microscopic regions essentially made of the second polymer component.

40. The process of claim 35, wherein the ion-conducting composite membrane comprises an ion-conducting polymer component and a structurally stable matrix.

41. The process of claim 35, wherein the ion-conducting composite membrane is a reinforced membrane having mechanical strength greater than the ion-conducting polymer alone.

42. The process of claim 35, wherein the step of combining the polymer components comprises blending, alloying, forming homogeneous solid solutions or mixing at high shear.

43. The process of claim 35, wherein the step of combining the polymer components is carried out over a first polymer to second polymer ratio between about 1 wt % and about 99 wt %.

44. The process of claim 43, wherein the step of combining the polymer components is carried out over a range of ratios such that the active first polymer component produces a continuous network.

45. The process of claim 35, wherein the step of combining the polymer components includes melting the polymers followed by thorough mixing of the molten polymers.

46. The process of claim 35, wherein the step of combining the polymer components includes co-precipitating a solution of the first polymer together with a suspension of the second polymer.

47. The process of claim 35, wherein the non ion-conducting polymer precursor to an ion-conducting polymer is the sulfonyl fluoride precursor to perfluorosulfonic acid.

48. The process of claim 35, wherein the non ion-conducting polymer precursor to an ion-conducting polymer is the sulfonyl fluoride precursor to partially derivatized, and fully derivatised copolymers of trifluorostyrenesulfonic acids.

49. The process of claim 35, wherein the non ion-conducting polymer precursor to an ion-conducting polymer is selected from partially derivatised and fully derivatised copolymers that give rise to various acid forms of trifluorostyrene polymers.

50. The process of claim 35, wherein the second electronically nonconducting and ionically nonconducting polymer is selected from polytetrafluoroethylene (PTFE), perfluoroalkoxy derivative of PTFE (PFA), fluorinated ethylene-propylene co-polymer (FEP), polysulfone, polymethylmethacrylate, silicone rubber, polyvinyl chloride, polyvinyl dichloride, polyvinyl fluoride (PVF), polystyrene, polytrifluorostyrene (TFS), polyetherketone, polyethersulfone, polyparaphenylene, and mixtures thereof.

51. The process of claim 35, wherein the step of fabricating the combined polymer components into a membrane includes casting the membrane from the mixed molten polymers.

52. The process of claim 35, wherein the step of fabricating the combined polymer components into a membrane further includes extruding the polymers.

53. The process of claim 35, wherein the step of fabricating the combined polymer components into a membrane further comprises:
 co-precipitating the mixed first and second polymer components to form a gelatinous mass;

filtering and washing the gelatinous mass;

drying the gelatinous mass;

forming a sheet or membrane by calendaring or pressing; and sintering and/or pressing the sheet or membrane at a temperature of about 150° C. to 300° C.

54. The process of claim 53, wherein the step of sintering and/or pressing is carried out by rolling the membrane or sheet between heated rollers, pressing between the heated platens of a hot press, or in a heated oven.

55. The process of claim 53, wherein the step of sintering and/or pressing is carried out at a temperature greater than 300° C.

56. The process of claim 35, wherein the second polymer is a porous membrane matrix, and wherein the step of fabricating the combined polymer components into a membrane further comprises:

filling the pores of the porous membrane matrix with a solution of the first polymer component; and removing the solvent from the pores of the porous membrane matrix forming an essentially pore-free composite membrane material.

57. The process of claim 35, wherein the second polymer is a porous membrane matrix, and wherein the step of fabricating the combined polymer components into a membrane further comprises:

filling the pores of the porous membrane matrix with the molten first polymer component; and cooling the molten polymer to form a solid filler occupying the voids in the membrane matrix.

58. The process of claim 35, wherein the step of chemically converting includes hydrolyzing the precursor with a base.

59. The process of claim 58, wherein the step of hydrolyzing the precursor is carried out in a solution of an alkali hydroxide at a temperature between 10° C. and 100° C.

60. The process of claim 59, wherein the alkali hydroxide is selected from lithium hydroxide, sodium hydroxide or potassium hydroxide.

61. The process of claim 58, wherein hydrolysis of the membrane or sheet is carried out at a temperature between 50° C. and 95° C.

62. The process of claim 58, wherein hydrolysis of the membrane or sheet is carried out at a temperature between 75° C. and 90° C.

63. The process of claim 58, wherein hydrolysis of the membrane or sheet is carried out using an alkali hydroxide concentration between 10 wt % and 40 wt %.

64. The process of claim 58, wherein hydrolysis of the membrane or sheet is carried out using an alkali hydroxide concentration between 20 wt % and 30 wt %.

65. The process of claim 35, wherein the chemically converted portion of at least the first polymer component forms an ion-conducting path capable of transporting ions through the membrane.

66. The process of claim 65, wherein the ion-conducting path comprises generally a hydrophilic path.

67. A membrane made by the method of claim 1.

68. The method of claim 1, wherein the second polymer comprises a porous matrix.

69. The process of claim 68, wherein the second electronically nonconducting and ionically nonconducting polymer in the form of a porous matrix provides mechanical reinforcement for the first polymer component.

70. A method of making an ion conducting composite membrane, comprising:

(a) combining a first electronically nonconducting and ionically nonconducting polymer component with at least a second electronically nonconducting and ionically nonconducting porous matrix, wherein at least the polymer component is an ionically nonconducting precursor to an ionically conducting polymer component;

(b) fabricating the combined polymer component and porous matrix into a membrane; and (c) converting at least a portion of at least the polymer component from the ionically nonconducting precursor form to the ionically conducting polymer form.

71. The process of claim 70, wherein the porous matrix is selected from an organic polymer or an inorganic material.

72. The process of claim 71, wherein the porous matrix is an inorganic material selected from fiber glass, rock wool, fibrous alumina, fibrous silica, other fibrous silicates, or alumino-silicates, or mixtures thereof which may or may not have an affinity for water.

73. The process of claim 70, wherein the porous matrix is in the form of a membrane or sheet.

74. The process of claim 73, wherein the porous membrane or sheet is resistant to degradation by aqueous acid or alkaline solutions.

75. The process of claim 70, wherein the porous matrix is formed by a second polymer, and wherein the step of combining includes the steps of utilizing a solution of the polymer component to fill the pores of the porous matrix formed by the second polymer matrix, followed by removing the solvent from the pores.

76. The process of claim 70, wherein the porous matrix is formed by a second polymer, and wherein the step of combining includes using the polymer component in a molten state to fill the pores of the second polymer followed by allowing the molten polymer to cool in the pores.

77. The process of claim 70, wherein the ionically nonconducting polymer precursor to an ionically conducting polymer is the sulfonyl fluoride precursor to perfluorosulfonic acid.

78. The process of claim 70, wherein the ionically nonconducting polymer precursor to an ionically conducting polymer is the sulfonyl fluoride precursor to partially derivatised, and fully derivatised copolymers of trifluorostyrenesulfonic acids.

79. The process of claim 70, wherein the ionically nonconducting polymer precursor to an ionically conducting polymer is selected from partially derivatised and fully derivatised copolymers that give rise to various acid forms of trifluorostyrene polymers.

80. The process of claim 70, wherein the porous matrix is formed by an electronically nonconducting and ionically nonconducting polymer selected from polytetrafluoroethylene (PTFE), perfluoroalkoxy derivative of PTFE (PFA), fluorinated ethylene-propylene copolymer (FEP), polysulfone, polymethylmethacrylate, silicone rubber, polyvinyl chloride, polyvinyl dichloride, polyvinyl fluoride (PVF), polystyrene, polytrifluorostyrene (TFS), polyether ketone, polyether sulfone, polyparaphenylene, and mixtures thereof.

81. The method of claim 70, wherein the polymer component is a thermoplastic or pseudo-thermoplastic, and wherein the porous matrix is formed by a thermoplastic or pseudothermoplastic.

82. The process of claim 81, wherein the pseudo-thermoplastic polymer is created by neutralizing the acid functional groups of a polymer with a stoichiometric amount of tetraalkylammonium hydroxide.

83. The process of claim 82, wherein the pseudo-thermoplastic polymer is created by neutralizing the acid functional groups of a polymer with a stoichiometric amount of tetrabutylammonium hydroxide.

84. The process of claim 83, wherein the polymer with acid functional groups is selected from perfluorosulfonic acid or partially derivatised or fully derivatised trifluorostyrenesulfonic acid.

85. The process of claim 82, wherein the first electronically nonconducting and ionically nonconducting thermoplastic or pseudo-thermoplastic polymer component is dissolved in an organic solvent.

* * * * *